United States Patent [19]

Goebel, Jr.

[11] 4,188,478
[45] Feb. 12, 1980

[54] INITIATORS FOR LACTAM POLYMERIZATION HAVING FIRST FUNCTIONAL GROUP, INTERMEDIATE GROUP, SECOND FUNCTIONAL GROUP

[75] Inventor: Charles V. Goebel, Jr., Wyomissing, Pa.

[73] Assignee: The Polymer Corporation, Reading, Pa.

[21] Appl. No.: 961,868

[22] Filed: Nov. 20, 1978

[51] Int. Cl.² ............................................. C08G 69/18
[52] U.S. Cl. .................................... 528/314; 528/315; 528/319; 528/320; 528/323; 528/326
[58] Field of Search ........................ 528/314, 315, 320

[56] References Cited

U.S. PATENT DOCUMENTS 3,558,568   1/1971   Kobayashi et al. .................. 528/314

*Primary Examiner*—Harold D. Anderson
*Attorney, Agent, or Firm*—Richard O. Church

[57] ABSTRACT

Novel polyamides are prepared having end groups especially selected to impart special properties to the polymer. These polyamides are prepared by utilizing anionic polymerization processes and the end groups can be of a type that, under existing methods, normally will hinder or completely stop the anionic polymerization reaction. The hindering effect of these end groups is largely overcome through the formation of novel initiator compounds that enables the polymerization reaction to proceed with extreme rapidity at comparatively low temperatures despite the presence of these end groups.

4 Claims, No Drawings

INITIATORS FOR LACTAM POLYMERIZATION HAVING FIRST FUNCTIONAL GROUP, INTERMEDIATE GROUP, SECOND FUNCTIONAL GROUP

BACKGROUND OF THE INVENTION

1. Field of the Invention

This invention relates to novel polyamides and to polymerization processes for producing them. More particularly, this invention relates to polyamides having novel end groups and to novel initiator compounds that are effective, in anionic polymerization processes, to cause the polymerization process to take place at rapid rates and at comparatively low temperatures despite the presence of end groups that could otherwise hinder or stop the polymerization.

2. Description of the Prior Art

The polymerization of lactams using anionic polymerization processes (as defined more fully below) has become a commercially significant method for preparing shaped lactam articles. Since the polymerizations can be conducted at temperatures below the melting point of the resulting polylactam, the liquid phase of the polylactam is avoided and the preparation of massive polylactam shapes in inexpensive molds and at atmospheric pressures is facilitated. In addition to providing rapid polymerizations and direct conversion from liquid monomer to solid polymer, these polymerization processes are advantageous in that the product generally has a low monomer content. Since the equilibrium constant favors monomer formation at higher temperatures, it is generally desirable to conduct the polymerization of lactams at temperatures at low as possible. Low polymerization temperatures are also advantageous for other obvious reasons such as simplifying operational techniques and avoiding oxidation of the polyamide.

It has been recognized in the prior art that the speed with which an anionic polymerization will proceed is generally dependent upon the type and amount of catalyst used, the type and kind of initiator used, the type of lactams being polymerized, and the temperature at which the polymerization is conducted. Of these variables, the two most significant ones, with respect to any given polymerization, are the selection of the initiator species and the selection of the temperature of the reaction. It is generally desired to conduct a rapid polymerization at low temperatures significantly below the melting point of the polymer since the polymerization proceeds to a greater extent at lower temperatures and, therefore, the selection of the initiator species becomes a controlling consideration.

Generally, it has been suggested by the prior art that certain initiator compounds may be categorized as "slow" and other as "fast". By this is meant that it has been observed that the so-called slow initiators will not cause the polymerization reaction to proceed until the temperature has been raised substantially above those temperature levels required by the so-called fast initiators. Since the initiator compound ultimately forms at least one end of the polylactam chain, the end groups on the polymeric chain are dependent upon the initiator species that are selected. From this it can be understood that the selection of end groups in the present state of the art is limited, as a practical matter, to those derived from the so-called fast initiators. Conversely, if the desired end group forms a part of a so-called slow initiator, undesirably high polymerization temperatures may be required. In still other cases, the desired end group cannot usefully be included in the initiator compound at all, due to the fact that an initiator so formed will not serve to initiate a useful polymerization reaction even at elevated temperatures well beyond the melting point of the polylactam. It has now been found that by the use of certain novel initiator compounds, the hindering effect of the end groups can largely be overcome, making it possible to prepare polylactams by anionic polymerization processes, having heretofore unobtainable end groups.

SUMMARY OF THE INVENTION

Accordingly, it is an object of this invention to form polylactams having novel selected end groups.

Another object of this invention is to provide for the rapid anionic polymerization of polylactams at comparatively low temperatures despite the apparent hindrance of the polymerization reaction caused by selected end groups on the initiator species.

Another object of this invention is to provide initiator species that may have greatly varying end groups that will promote the rapid polymerization of lactams at comparatively low temperatures.

Another object of this invention is to provide polylactams having greater color stability.

Another object of this invention is to provide a polylactam that may be chemically bonded to a filler or reinforcing agent.

Another object of this invention is to provide polyamides that may be chemically bonded to a pigment or a dye.

Another object of this invention is to provide polylactams that may be grafted onto other natural or synthetic resin systems.

Another object of this invention is to provide polylactams with unique end groups such as may be cross-linked with other compounds or may be cross-linked with themselves, as, for example, by actinic stimulation.

Briefly, these and other objects of this invention are achieved by providing an initiator species having a first functional group comprised of a lactamate at one end, a second functional group comprised of the selected end group at the other end, and a third functional group separating the first and second groups that is of sufficient length to remove the second group functionally from the active polymerization site where the lactam ring opens between the acyl group and tertiary nitrogen atom during initiation. Such an initiator has proved to be effective since it has been discovered that the inhibiting effect of the various end groups on the initiator species will result when the end groups are more electropositive than is the N,N-diacyl group. When this occurs, the reaction between the initiator species and the sodium lactam to cleave the lactam ring will not proceed, or at least only at undesirably high temperatures. It has been discovered, however, that rapid polymerization may be conducted at comparatively low temperatures even though the end group is quite electropositive by physically separating the end group from the lactamate group at the other end of of the initiator to a sufficient degree that the induction effect is effectively dissipated.

In order to better understand this invention, the following brief description is given of the anionic polymerization of lactams.

(A) The General Polymerization System

This invention is particularly concerned with the polymerization of lactams that can be initiated at temperatures of the order of about 80° C. or higher, and generally below the melting point of the resulting polylactam, by the anionic polymerization of such lactams in the presence of specific initiator compounds such as N-substituted imides (e.g., N-acyl lactams, cyclic imides of dicarboxycyclic acids, etc., N-acyl sulfonamides, disulfonamides, N-nitroso amides, N-nitroso sulfonamides, and various thioacyl analogs, isocyanates, and N,N'-disubstituted and trisubstituted ureas and thioureas). These polymerization processes are discussed more completely, for example, in U. S. Pat. Nos. 3,017,391; 3,028,369; and 3,086,962.

(B) The Catalyst System

Suitable anionic catalysts in the polymerization of lactams are any of the metals, which can be in metallic, complex ion or compound form, that are capable of forming lactam salts (e.g., sodium and caprolactam to form sodium caprolactam). Common examples of such catalysts suitable for the anionic polymerization of the high lactams are the alkali and alkaline earth metals, e.g., sodium, potassium, lithium, calcium, strontium, barium, magnesium, etc., either in metallic form or in the form of hydrides, borohydrides, oxides, hydroxides, carbonates, etc. However, in the case of compounds such as the hydroxides and carbonates which give off water when reacted with lactams, the bulk of such water preferably is removed so that the polymerization may be conducted under substantially anhydrous conditions. This may be achieved by forming a catalyst concentrate by prereacting a catalyst and lactam, removing any undesired reaction products, such as water, hydrogen, or carbon dioxide, by means of heat and/or reduced pressures, from the concentrate, and then mixing the concentrate, in desired proportions, to additional quantities of a lactam immediately prior to polymerization.

Other effective catalysts are the organo-metallic derivatives of the foregoing metals, as well as of other metals. Examples of such organo-metallic compounds are the lithium, potassium, and sodium alkyls, such as butyl lithium, ethyl potassium, or propyl sodium, or the aryl compounds of such metals, such as sodium phenyl, triphenylmethyl sodium, and the like. Other suitable organo-metallic compounds are diphenyl magnesium, zinc diethyl, triisopropyl aluminum, diisobutyl hydride, etc.

As a general class, the materials known as Grignard reagents are also effective base catalysts for the present polymerization. Typical of such Grignard catalysts are ethyl magnesium chloride, methyl magnesium bromide, phenyl magnesium bromide, and the like. Other suitable anionic polymerizaton catalysts are sodium amide, magnesium amide, and magnesium anilide, as well as numerous others.

The catalyst concentration employed in the instant process may vary from a small fraction of 1 mole percent, e.g., from about 0.01 mole percent, to as much as 15 to 20 mole percent, based on the lactam monomer. In general, however, the preferred catalyst concentrations will vary from about 0.05 to about 5 mole percent, and more preferably still, from about 0.1 to about 1 mole percent.

(C) The Lactams

The lactams useful in this invention are those that may generally be classed as the higher lactams that contain at least 3 carbon atoms in the lactam ring. These higher lactams are useful in that they may readily be polymerized in the low temperature polymerization processes. These polymerizations take place with rapidity and, particularly when conducted at temperatures below the melting point of the resulting polylactams, result in a high conversion (e.g., at least 95%) from monomer to polymer.

The higher lactams with which this invention is concerned may be generally illustrated by the formula:

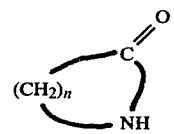

wherein n is an integer of at least 2 and up to 15, and preferably wherein n is an integer from 5 to about 12.

(D) The Initiators

In order to conduct the anionic polymerization of lactams at comparatively low temperatures—that is, at or below the melting point of the resulting polylactams—it is necessary to use an initiator compound. Many of these initiators include compounds such as organic isocyanates, ketones, acid chlorides, acid anhydrides, and N-substituted imides having the structural formula

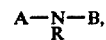

wherein A is an acyl radical such as carbonyl, thiocarbonyl, sulfonyl, phosphinyl, and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

It is often desirable to conduct the polymerization of the lactams under such conditions that some cross-linking takes place. This readily may be accomplished by means of polyfunctional initiator compounds that will form sites for the growth of more than one polymeric chain and thus act as a link between them. As examples of suitable polyfunctional initiators may be mentioned diisocyanates such as p-phenylene diisocyanate, 2,4-tolylene diisocyanate, di(p-isocyanatophenyl) methane, 2,2-di(p-isocyanatophenyl) propane, p,p'-diisocyanatodiphenyl, ethylene diisocyanates, N,N-di(isocyanatoethyl)amine, etc.; tri- and polyisocyanates such as 1,3,5-triisocyanatobenzene, 1,3,8-triisocyanatonaphtalene, tri(p-isocyanatrophenyl)methane, 4-(p-isocyanatobenzyl)-1,3-phenylene diisocyanate, 2,5-di(p-isocyanatophenyl)phenyl isocyanate, 2,4- di(p-isocyanatobenzyl)phenyl isocyanate, etc. Also, other particularly effective cross-linking initiators are the low molecular weight polymethylene polyphenyl isocyanates such as may be obtained, for example, from the Upjohn Company under the trade designation PAPI.

Advantageously, the amount of the initiator compound may vary from about 0.01 to about 20 mole percent, preferably from about 0.05 to about 5 mole percent, and more preferably still, from about 0.1 to about 1 mole percent, based on the lactam being polymerized. As was mentioned above with regard to the catalysts, the initiators may be premixed to form an initiator concentrate that may be diluted by mixing with additional monomer immediately prior to polymerization. By one convenient method, a reactive mixture, that is, one comprised of the desired quantities of a lactam, an anionic catalyst and an initiator, is prepared by mixing a catalyst concentrate with an initiator concentrate immediately prior to the commencement of the polymerization reaction.

(E) Modifiers

If a more uniform molecular weight distribution is desired, it may be useful to include a certain class of compounds called "modifiers" (sometimes referred to in the prior art as "regulators"). These modifiers are used in connection with the above-described initiators and are generally either primary or secondary amines. Such amines can be either aliphatic or cyclic amines. The aliphatic amines can be either saturated or unsaturated and either normal chain or branched chain. The cyclic amines can be either ones in which the amino nitrogen atom is a part of the ring (i.e., N-heterocyclic amines) or ones in which the rings are merely attached to the amino nitrogen atom (i.e., as in alicyclic, heterocyclic, or aromatic substituted amines). The secondary amines can be either symmetrical (i.e., containing two identical radicals attached directly to the amino nitrogen atom) or unsymmetrical, the latter group including mixed aryl-alkyl amines, unsymmetrical alkyl amines, etc.

The primary amines have been found generally more suitable than the second amines. In order for the secondary amines to be markedly effective, they should have a basicity greater than that of N-methylaniline.

Examples of typically suitable amines which are useful as modifiers are as follows: methylamine, ethylamine, n-propylamine, i-propylamine, n-butylamine, t-butylamine, n-pentylamine, t-amylamine, n-hexylamine, 2-ethylhexylamine, n-octylamine, n-decylamine, laurylamine, cetylamine, n-hexadecylamine, stearylamine, allylamine, w-decenylamine, oleylamine, benzylamine, phenethylamine, cyclohexylamine, cyclopentylamine, cyclopentenylamine, aniline, ortho-, meta-, and para-toluidine, 2,4-, 2,5- and 3,5-xylidines, a-and B-naphthylamine, furfurylamine, thenylamine, dimethylamine, diethylamine, di-2-ethylhexylamine, diallylamine, dicyclohexylamine, ethylmethylamine, n-butyl-2-ethylhexylamine, allylmethylamine, n-butylpropenylamine, cyclohexylethylamine, piperidine, piperazine, morpholine, etc.

The concentration of modifying amine to be used in the present invention is dependent upon the concentration of initiator utilized. In general, the preferred proportions constitute equimolar proportions of the initiator and the modifier. However, considerable deviation from equimolar proportions can be tolerated without losing the desirable effect of obtaining a narrow distribution of molecular weights.

(F) The initiator Function

To understand the basis of this invention, it is pointed out that the reaction mechanism of the anionic polymerization of lactams is considerably different from the aqueous polymerization of lactams as may be practiced in the commercial production of nylon 6 from caprolactam. The aqueous polymerization involves hydrolysis of the lactam with water to form a linear amino acid, followed by condensation of the amino groups and carboxyl groups to form a linear polyamide. In contrast thereto, the anionic polymerization of lactam is carried out in the complete absence of water, without formation of amino acids. The initial mechanisms of the anionic polymerization of caprolactam may be represented as follows:

1. Primary Initiation

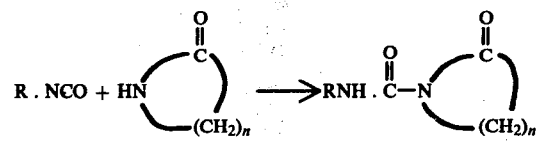

2. Polymerization Initiation

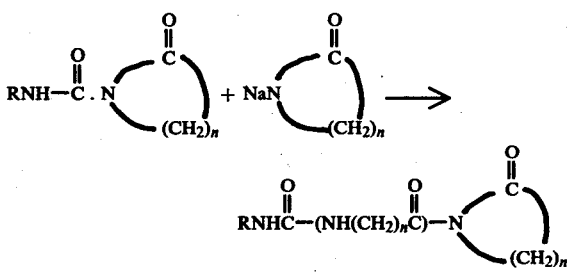

3. Propogation of Polymer Chain

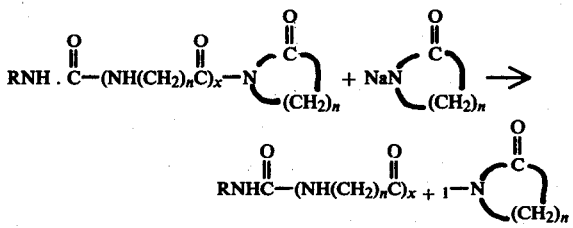

The above reactions will continue indefinitely as the sodium atom is repeatedly transferred to a new lactam monomer molecule that in turn becomes attached to the polymeric chain by opening a lactam ring at the end of the molecule. It will be observed that three separate reactions are involved. The first equation illustrates the primary initiation by the reaction of the initiator compound with the lactam monomer to form the initiation species. This reaction proceeds quite readily at comparatively low temperatures.

The second equation illustrates the initiation of the polymerization wherein the initiation species reacts with a catalyzed monomer molecule to cleave the lactam ring and start the initial growth of the polymeric chain. The product of that reaction may be termed the first polymerization species and it is used as the initiator of the invention. This reaction will proceed only above a minimum temperature that is largely determined by the R group in the RNCO initiator compound.

Although it had previously been thought that the propagation steps were the rate determining steps, we have found that the propagation of the polymeric chain as illustrated by Equation 3 proceeds rapidly at an energy level less than that required in Equation 2. For this reason, in the anionic polymerization of lactams, the rate determining step of the reaction is the reaction illustrated by Equation 2. After the energy level is sufficiently high to cause the reaction illustrated by Equation 2 to take place, the minimum energy level in the system is then at such a level that the reaction of the growing chains with catalyzed lactam monomer is self-sustaining and is no longer influenced by the nature of the R group at the other end of the chain. Thus, the propogation reaction (Equation 3) will be influenced solely by the catalyst species and the nature of the lactam end group on the growing chain.

As noted above, the polymerization initiation illustrated by Equation 2 takes place at a rather specific minimum temperature that is dependent largely upon the R group of the initiator compound. For convenience, this minimum temperature required to cause the reaction to take place is referred to herein as the "activation temperature". Stated somewhat differently, the activation temperature may also be defined rather arbitrarily as that temperature at which the initiator species will be effective to enable the polymerization reaction to proceed autogenously under substantially adiabatic conditions.

As discussed above, the R group of the initiator compound will ultimately form at least one of the end groups on the polymeric chain. If this end group is more electropositive than the N,N'-diacyl group of the lactam ring it will prevent the polymerization reaction from taking place. However, if this inhibiting end group is physically removed from the reactor site where the lactam ring is opened, the induction effect will be avoided and the polymerization will proceed rapidly at low temperatures, all without regard (within reasonable limits) as to the nature of the end group. Accordingly, this invention makes use of an initiator specie that has a first functional end group comprised of a lactamate for initiation, a second functional group of desired characteristics at the other end, and a third intermediate group comprised of an organic chain of sufficient length to remove the second group an adequate distance from the first group to avoid induction effect. It will be understood that the minimum length required of this third intermediate group will be determined by how electropositive the second end group is as compared with the N,N'-diacyl group of the lactamate.

The following formula summarizes the initiator species useful in this invention and the dotted lines indicate the three functional groups:

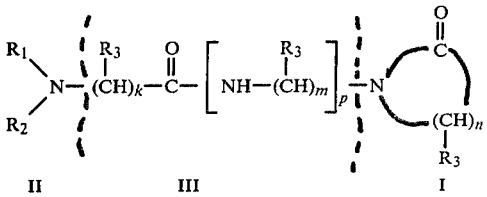

where k, m, and n can each be 1 to 14, but are preferably 5 or 11 since these initiators are the easiest to synthesize; p is 0 to 10 and is most preferably 0 as these initiators are also easier to synthesize; each $R_3$ can by hydrogen, alkyl having 1 to 13 carbon atoms, aryl, substituted aryl, halogen, nitro, nitroso, amino, alkyl substituted amino, aryl substituted amino, carboxyl, or carboalkoxy; each R is preferably hydrogen, alkyl having 1 to 6 carbon atoms, aryl, nitro, or amino as these compounds are more readily available, and each $R_3$ is most preferably hydrogen. The structure of $R_1$ and $R_2$ in the formula are not important in the polymerization so long as $R_1$ and $R_2$ are non-reactive end groups, i.e. $R_1$ and $R_2$ must not react with the lactam monomer, the catalyst, the fillers, or other substances present during the polymerization so as to detrimentally interfere with the polymerization. Although $R_1$ and $R_2$ must not adversely affect the polymerization, they need not be completely inert and may be selected for properties such as light sensitivity, improved dyeability, solid substrate bonding, or facility with which they can be grafted to other polymeric species. Examples of $R_1$ and $R_2$ include monovalent radicals such as hydrogen, carbobenzoxy, t-butoxyl carbonyl, benzoyl, and acetyl; also $R_1$ and $R_2$ may together form a divalent radical such as phthalimido, imino, or azine.

We prefer to select $R_1$ and $R_2$ so that the initiator will be easy to synthesize as it is usually more feasible to synthesize the initiator than it is to obtain it by terminating the polymerization once it has started. The following class of initiators are preferred:

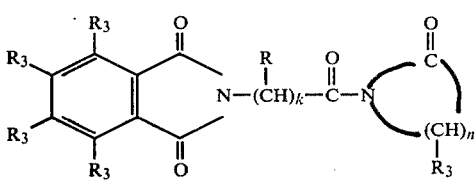

where $R_3$, K, and n are as hereinbefore described, each R is independently selected, and omega compounds are preferred as they are more readily available.

In connection with this preferred initiator, the second functional group could be 3 or 4—trimethoxysilylmethyl—phthaloyl-amino if it is desired to bond the end group to a filler or 3- or 4—trimethylamino—-phthaloyl-amino if it is desired to bond the end group to a dye. Crosslinking with other polymers can be accomplished with 3- or 4- acrylophthaloyl-amono, 3- or 4-vinyl-phthaloyl-amino, or 3,6-or 4,5-divinyl-phthaloyl amino end groups.

The initiators of this invention are used in the anionic polymerization of lactams in the same manner as are other lactam initiators such as the isocyanate initiators disclosed by Butler U.S. Pat. No. 3,028,369, and they can be substituted for isocyanate initators on a molar basis. Generally, these initiators may be added in concentrations of 1/100 to 10 mole percent and preferably in concentrations of 1/10 to 1 mole percent. The polymerization reaction is as follows:

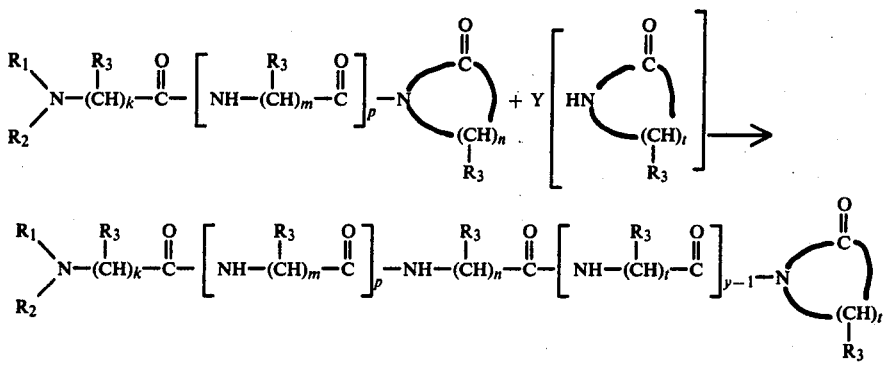

where m, n, p, $R_1$, $R_2$, and $R_3$ are as hereinbefore described, t has the same definition as n but need not be the same number as n, and Y is about 100 to about 10,000 or higher and preferably is 200 to 1000 since the polymer has better properties if Y is greater than 200, and the production of a polymer where Y is greater than 1000 requires ultra-pure catalysts which are expensive. Mixtures of lactam monomers or mixtures of polymerization species are also included within the scope of this invention.

In addition to producing a faster polymerization, the methods of polymerization here disclosed tend to produce much whiter products than do polymerizations with isocyanate initiators; a whiter product is desirable because subsequent fiber-forming operations require a white starting material in order to produce a white product. It is also believed that the polymers produced by the methods of this invention will be more linear, will have a more uniform molecular weight distribution, and will have more reproducible physical properties. Other advantages may become apparent as they are more widely applied.

The following are examples illustrating lactam polymerizations using our methods.

EXAMPLE I
POLYMERIZATION OF CAPROLACTAM 10 g. of a solution of 1.0 mole % sodium caprolactamate in molten caprolactam was heated to 160° C. In a separate test tube, 0.32 g. of N-phthaloyl-omega-aminocaproic caproimide was dissolved in 10 g. caprolactam to give a 1.0 mole % solution which was heated to 160° C. The two solutions were quickly mixed and within one minute solid polycaprolactam crystallites had formed. The same polymerization using phenyl isocyanate as an initiator requires about five minutes to polymerize. The product was much whiter than similar products produced with isocyanate initiators.

EXAMPLE II
POLYMERIZATION OF CAPROLACTAM

The experiment of Example I was re-run using 0.50 g. N-phthaloyl-omega-aminolauric laurylimide in place of N-phthaloyl-omega-aminocaproic caproimide. Similar results were observed in that complete polymerization occurred in less than one minutes, yielding a white product.

EXAMPLE III
POLYMERIZATION OF LAURINLACTAM

The experiment of Example II was re-run using laurinlactam instead of caprolactam. The resulting product was whiter than products produced by isocyanate-initiated polymerizations of laurinlactam.

I claim:

1. A method for the base catalized polymerization of lactams to form solid products comprising reacting a lactam in the presence of catalyst with an initiator of the general formula:

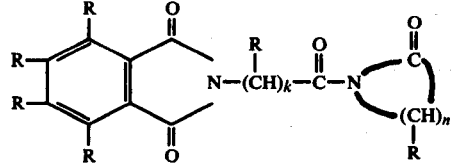

where k and n are each from 1 to 14 and each R is independently selected from the group consisting of hydrogen, alkyl having 1 to 13 atoms, aryl, substituted aryl, halogen, nitro, nitroso, amino, alkyl substituted amino, carboxyl, and carboalkoxy.

2. A method according to claim 1 wherein k and n are each from 5 to 11.

3. A method according to claim 1 wherein each R is independently selected from the group consisting of hydrogen, alkyl of 1 to 6 carbon atoms, aryl, nitro and amino.

4. A method of producing a solid polylactam having a desired end group comprising reacting a lactam monomer and a base catalyst with an initiator having a first functional group comprised of a lactamate radical, a second functional group comprised of phthalimido radical substituted with the desired end group, and a third intermediate group separating the first and second functional group comprised of an organic chain of a length sufficient to inhibit an induction effect between the first and second functional groups.

* * * * *